United States Patent [19]

Hexel et al.

[11] Patent Number: 4,771,387

[45] Date of Patent: Sep. 13, 1988

[54] BRAKE TESTING SYSTEM FOR MOTOR VEHICLES

[75] Inventors: Hans Hexel, Braunschweig-Volkmarode, Fed. Rep. of Germany; Harold Marenbach, Mt. Clemens, Mich.

[73] Assignee: Dominion Tool & Die Co., Roseville, Mich.

[21] Appl. No.: 887,251

[22] Filed: Jul. 18, 1986

[51] Int. Cl.$^4$ .................. B60T 17/22; G06F 15/20
[52] U.S. Cl. .................. 364/426.02; 73/121; 73/132; 340/52 B; 364/426.01
[58] Field of Search .................. 364/426, 550, 551; 303/92; 73/121, 132; 340/52 B

[56] References Cited

U.S. PATENT DOCUMENTS

| | | | |
|---|---|---|---|
| 3,866,979 | 2/1975 | Rabus et al. | 303/92 |
| 3,877,299 | 4/1975 | Clayton, Sr. et al. | 73/132 |
| 4,047,149 | 9/1977 | Akita et al. | 340/52 B |
| 4,062,224 | 12/1977 | Zeleney | 73/121 |
| 4,186,595 | 2/1980 | Domitter | 73/132 |

OTHER PUBLICATIONS

GM Product Service Training brochure entitled, "Teves Anti-Lock Brake System (ASB)", Oct. 1985.

*Primary Examiner*—Gary Chin
*Attorney, Agent, or Firm*—Harness, Dickey & Pierce

[57] ABSTRACT

A method and apparatus for testing motor vehicle anti-skid braking systems is disclosed which is particularly well suited for production line verification of the anti-skid braking system integrity. The method comprises monitoring the operation of a pressure generating device which operates intermittently to generate brake actuating pressure independently of application of the vehicle brake pedal while simultaneously and cyclically applying a predetermined operating force to the vehicle brake pedal and measuring the distance of travel thereof for each successive operation. The first phase of the test procedure enables verification of the operation of the pressure generating device and associated controls therefor whereas the second phase of the test sequence verifies the absence of fluid or pressure leakage in another portion of the braking system. The apparatus comprises sensor means operative to sense operation of the pressure generating device while simultaneously controlling operation of a pressure actuated device operative to sequentially and cyclically depress the vehicle brake pedal and simultaneously measure the amount of travel associated with subsequent applications of force thereto.

16 Claims, 3 Drawing Sheets

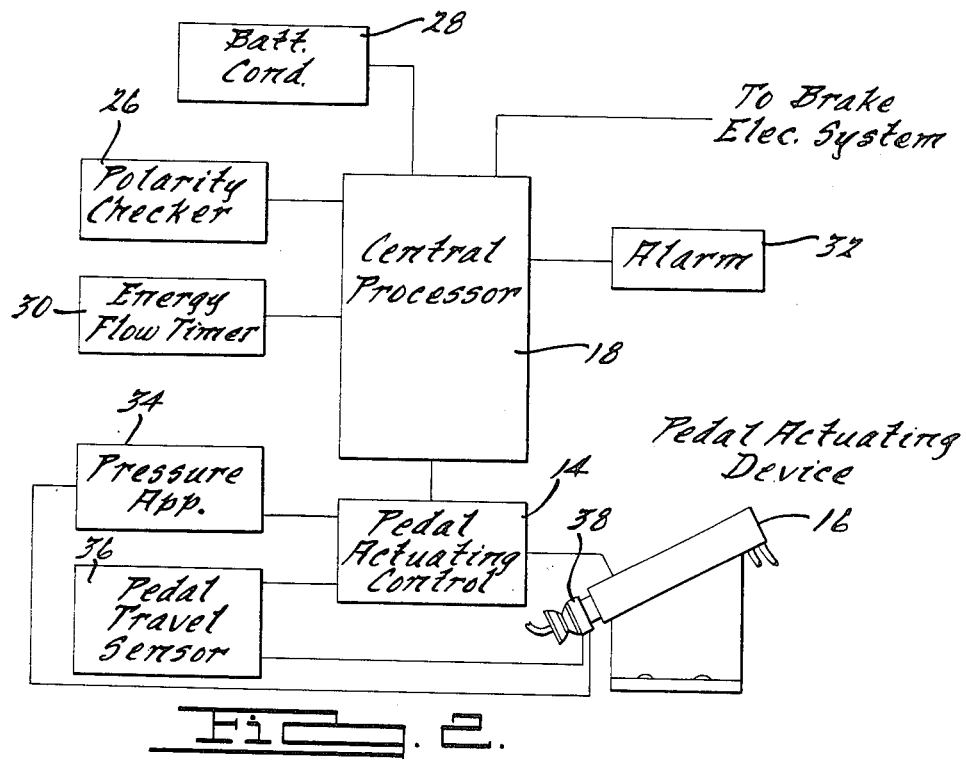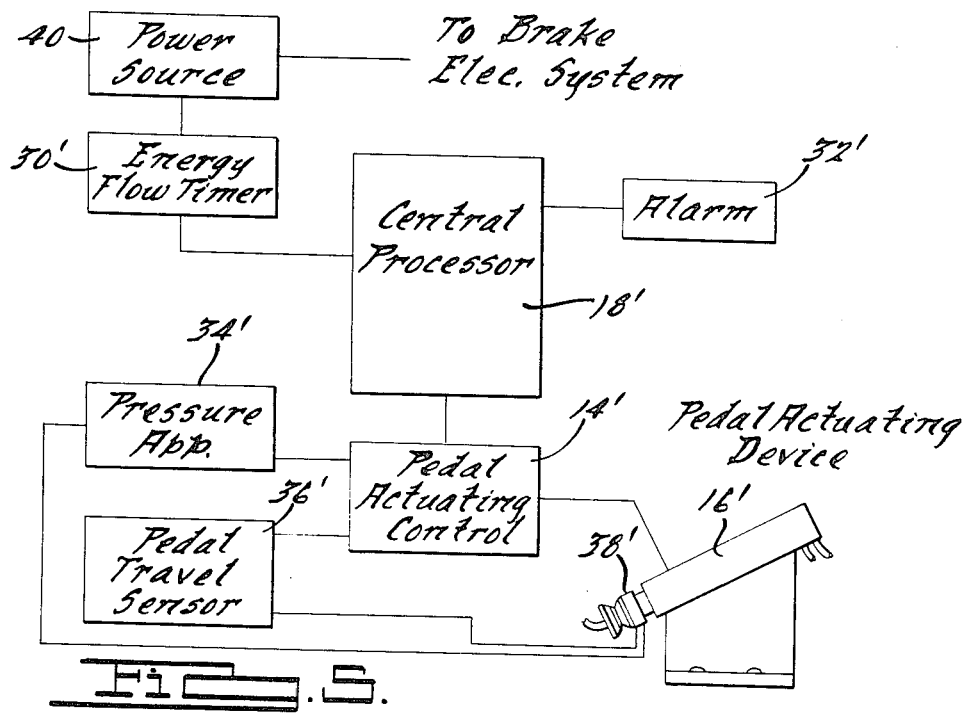

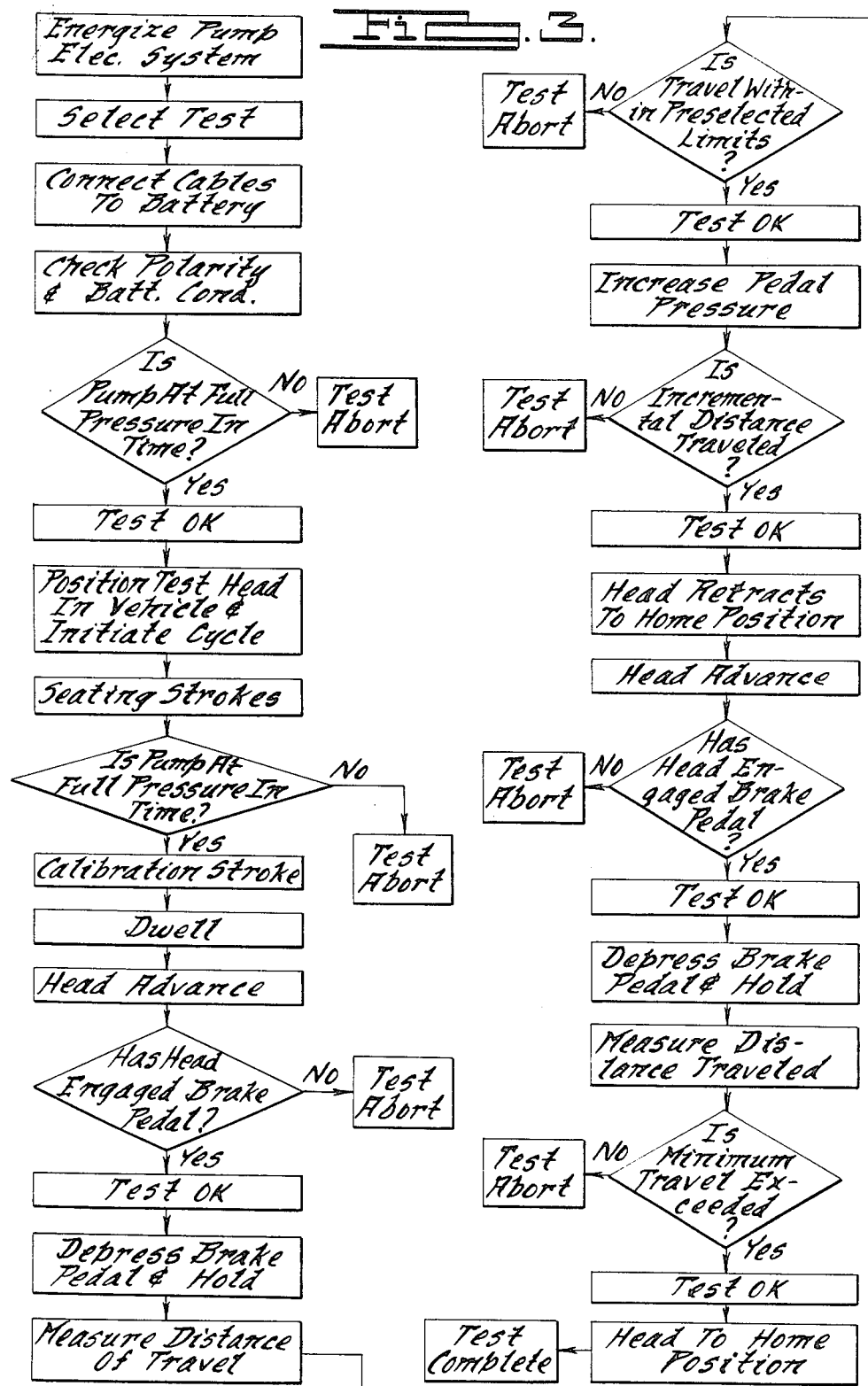

BRAKE TESTING SYSTEM FOR MOTOR VEHICLES

BACKGROUND AND SUMMARY OF THE INVENTION

The present invention relates generally to systems for testing motor vehicle braking systems and more specifically to such systems which are specifically designed to test in a production line environment anti-skid braking systems presently being employed on some motor vehicles.

Production line testing of conventional vehicle braking systems has long been accomplished by means of power actuated devices which act against the vehicle brake pedal and operate to depress the brake pedal by means of applying a constant predetermined force thereto. Any leakage within the conventional hydraulic braking system is detected by measuring additional movement of the pedal during the test duration. Because the brake system is operated by means of fluid pressure generated directly by force applied to the brake pedal, any leakage from the brake system will result in increased pedal travel during the time period in which the force is maintained on the brake pedal. Accordingly, this approach has provided a simple and reliable method for testing the integrity of such conventional hydraulic brake systems.

In order to improve a motor vehicle operator's ability to bring a motor vehicle to a stop within a minimum distance and without loss of control, improved braking systems have been developed which include means to sense the rate of deceleration of the vehicle wheels and to alternately and cyclically release and reapply the braking action to any wheel experiencing an excessively high rate of deceleration. Such improved braking systems are commonly referred to as anti-skid braking systems and are presently being employed on certain models of motor vehicles presently offered for sale.

One form of such anti-skid braking system presently being offered on motor vehicles employs an electrically driven hydraulic pump which cyclically operates to generate a pressure in an accumulator associated therewith. Pressure from this accumulator is then selectively fed to the rear brakes of the motor vehicle and operates to actuate these rear brakes as well as to provide a power assist to operation to the front brakes of the vehicle. The primary operating force for application of the front brakes in this system relies upon the direct linkage between the vehicle brake pedal and the respective wheel cylinders/calipers via the master cylinder all in accordance with conventional braking systems. However with respect to the rear braking system, this is operated entirely by the pressure generated by the hydraulic pump and stored in the associated accumulator, there being no direct fluid nor mechanical linkage between the brake pedal and associated braking system.

Thus, because the anti-skid braking systems do not employ any direct mechanical or fluid interconnection between the brake pedal and the fluid system actuating the rear brakes, it is not possible to test the integrity of such systems in the manner previously employed as noted above. It should also be noted that in order to test such systems, it is desirable not to disconnect or otherwise break into the closed fluid system employed for actuation of the rear brakes due to both the time required to disconnect and reconnect the system as well as the potential that a leak may result should the reconnection not be made in a secure manner. It is also desirable to avoid the necessity to permanently include any additional sensing means as an integral part of the motor vehicle as the inclusion of such sensing means not only would require additional connections which may give rise to points of leakage from the system, but also would result in increased overall cost to manufacture the motor vehicle.

Accordingly, the present invention provides a method and apparatus for carrying out this method whereby such anti-skid braking systems may be easily and efficiently tested to assure that all connections associated therewith are fluid tight as well as to insure that various portions thereof are operating in accordance with the design specifications intended for such systems. The present invention incorporates sensor means to sense the duration and frequency of operation of the electrically driven hydraulic pump which sensor means operate in conjunction with means operative to sequentially and cyclically depress the motor vehicle brake pedal. In addition, the motor vehicle brake pedal operating means includes sensor means to sense the distance travelled by the brake pedal during each successive operation and to provide a signal indicative of this distance which is then compared with a prior signal to determine if the distance of travel falls within a predetermined range. Thus, by sensing the duration of operation of the hydraulic pump, it is possible to determine if the hydraulic pump is properly genreating the required pressure as well as determination of a possible defective pressure sensor within this portion of the system. The sensing of the distance of travel of the brake during successive operations provides an indication of any potential leaks within the brake actuating lines which would result in premature decrease in the pressure within the system. Further, continuous monitoring of the operational condition of the hydraulic pump will provide a further indication of leakage within the system resulting in premature pressure loss.

Thus, the present invention provides both a method and apparatus for carrying out this method which is particularly well suited for use in a production line environment in that it entails a relatively minimal amount of interconnection with the motor vehicle as it is moving down the production line and also incorporates a method which may be carried out in a relatively brief time period thus avoiding any excessive delays in movement of vehicles along the production line.

Additional advantages and features of the present invention will become apparent from the subsequent description and the appended claims taken in conjunction with the accompanying drawings.

BRIEF DESCRIPTION OF THE DRAWINGS

FIG. 2 is a schematic block diagram of the apparatus of the present invention;

FIG. 3 is a flowchart illustrating the sequence of events performed in practicing the method in accordance with the present invention utilizing the apparatus illustrated in FIG. 2;

FIG. 5 is a schematic block diagram similar to that of FIG. 2 but illustrating an alternative embodiment of the apparatus in accordance with the present invention.

DESCRIPTION OF THE PREFERRED EMBODIMENT

Figure 1:
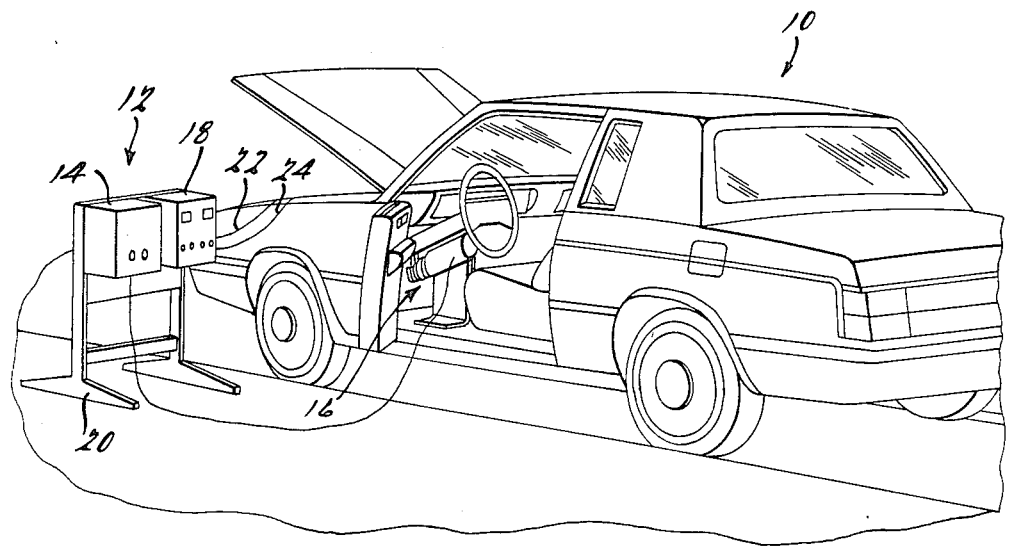
FIG. 1 is a perspective view of a motor vehicle being moved down an assembly line and presently located within a brake testing station, the test apparatus in accordance with the present invention being shown connected to the motor vehicle.

Referring now to the drawings and more specifically to FIG. 1, there is illustrated a motor vehicle 10 advancing down an assembly line, the assembly thereof being substantially complete, and the vehicle 10 being presently positioned in a work station for undergoing a brake testing procedure in accordance with the present invention. The apparatus in accordance with the present invention for administering the brake test on the anti-skid braking system incorporated on vehicle 10 is illustrated as being positioned alongside the assembly line and being generally indicated by reference numeral 12.

The test apparatus 12 comprises a pedal actuating controller housing 14 having means disposed for controlling the operation of a brake pedal actuating device 16 shown in operative relationship within the vehicle 10. A central processor housing 18 is also supported on a common stand 20 in any suitble manner and has a pair of cables 22, 24 exiting therefrom which are adapted to be removably connected to the motor vehicle electrical system such as for example to the battery cables or terminals (not shown) of the motor vehicle 10. This second housing 18 contains the central processing unit and receives input from both the cables 22, 24 connected to the vehicle electrical system as well as from the control housing 14 and processes this information and provides a visual and/or audio indication of the acceptability or non-acceptability of the vehicle braking system as a result of the test procedure in accordance with the present method.

In a presently preferred embodiment of the present invention, the test cables 22, 24 are adapted to be connected to the vehicle battery which is already connected to the vehicle electrical system by means of the conventionally employed battery cables. Accordingly, as illustrated with reference to FIG. 2, the central processor housing 18 includes a first sensor 26 for performing a polarity check to insure that the interconnection with the vehicle battery has been made with the correct polarity. Further, suitable sensor means 28 are also employed in order to verify and record the battery condition, that is the level of charge provided on the vehicle battery as well as the voltage output therefrom. This aspect is an important consideration as the condition of the battery will have a direct impact on the run time required for the hydraulic pump of the vehicle brake system to achieve full pressurization of the system. Timer means 30 are also provided within the central processing housing 18 which operate to time the duration during which significant amounts of power are being drawn from the vehicle battery system and thus provide an indication of both when the hydraulic pump is started as well as the duration of operation thereof. Because the hydraulic pump draws a relatively high amount of energy during operation thereof, it is relatively easy to differentiate the cyclic on-off sequencing thereof from any other accessories which may be also operating at the same time. A suitable audio and/or visual alarm 32 is also provided in connection with the central processing housing 18 which will provide an indication in the event a vehicle brake system fails the test procedure.

The pedal acutating device 16 is directly connected and operatively controlled by the pedal actuating controller 14 which also receives signals from sensors 34 and 36 associated with the head 38 of the pedal actuating device 16 to verify the actual pressure being applied to the brake pedal as well as signals indicative of the amount of travel of the brake pedal during various phases of the test procedure respectively as described in greater detail below. Suitable signals indicative of the distance travelled by the pedal actuating device and hence the vehicle brake pedal are transmitted from the pedal actuating controller to the central processing unit for integration with the overall system. Preferably, the pedal actuating device will be of the general type disclosed in U.S. Pat. No. 4,186,595 although a device of the type disclosed in U.S. Pat. No. 4,307,604 which attaches directly to the master cylinder could also be employed.

In carrying out the method of the present invention, it is presently anticipated that the vehicle electrical system will be substantially fully complete and the vehicle battery already connected at some work station prior to the vehicle 10 arriving at the brake test station. Accordingly, in order to minimize the amount of time required to perform the vehicle brake testing procedure, the brake system will be energized at a work station immediately preceding the brake test work station so as to thereby enable the electrically driven hydraulic pump to fully pressurize the associated accumulator forming a part of the anti-skid brake system. This may be conveniently done by merely inserting the ignition key and turning the key to an "on" position at which time the pump and associated controls will sense the low pressure condition of the brake system and operate for a period of time sufficient to raise the pressure within the accumulator to the desired maximum shutoff pressure. This initial pressurization of the anti-skid brake system will easily occur during transfer of the vehicle 10 from the prior work station to the brake test station.

Upon arrival of the vehicle 10 at the brake test work station, the operator will first select the appropriate test procedure to be followed for the vehicle 10 then approaching. It should be noted at this point that presently not all vehicles are equipped with this anti-skid braking system and hence vehicles traversing down the assembly line will encompass both vehicles with conventional brake systems and with the anti-skid braking system. The test apparatus is preferably capable of accommodating both types of braking systems although the portion of the test apparatus employed for testing of the conventional brake system forms no part of the present invention and hence description thereof has been omitted herefrom.

Once the operator has selected the test procedure appropriate for the ani-skid braking system, he will proceed to connect the cables 22, 24 to the vehicle battery. At this point in time, the test apparatus will sense the polarity of the cable connections and provide a visual/audible indication of an incorrect or reversed polarity whereupon the operator may switch the connection. Additionally, the apparatus will record the battery condition, that is the level of charge and voltage output of the battery and record this information for further reference. This information may then be used to establish a predetermined operating time range for the hydraulic pump. Additionally the test apparatus will also sense if the hydraulic pump is still running and hence the anti-skid brake system has not achieved full pressure for some reason such as for example a substantial leak in one of the connections of the system or defective pump or pressure sensor provided in the system. If in fact the pump has not achieved full pressure at this point in the test, the vehicle will be rejected and the balance of the test aborted.

Assuming that the pump has ceased to run prior to the connection of the cables to the battery and thus the anti-skid braking system is fully pressurized, a "test OK" signal will be displayed to the operator and he will then proceed to position the pedal actuating device 16 in position within the vehicle and initiate the automatic cycling thereof. At this point in time, the pedal actuating controller 14 will operate the pedal actuating device 16 to apply an intial actuating force to the brake pedal so as to thereby actuate the vehicle brake system. The purpose of this initial actuation of the pedal actuating device 16 is to both seat the pedal actuating device within the vehicle 10 as well as to seat the various components of the vehicle brake system. A plurality of these oscillation strokes will be conducted until such time as the pressure in the anti-skid brake system has been reduced to a point where the hydraulic pump turns on or alternatively, a preset time period expires. If the preset time period expires before the pump has achieved full pressure, this indicates a malfunction of the system, the vehicle is rejected and the balance of the test is aborted.

In one particular application of the test apparatus and method of the present invention, the high pressure point of the anti-skid braking system will be approximately 180 bar and the low pressure point at which the hydraulic motor will initiate operation so as to raise the brake system pressure will be 140 bar. It is also anticipated that approximately 10 bar of pressure will be required for each actuation of the brake system and hence an interval of approximately four operations of the brake pedal will result in a restart of a hydraulic pump in order to raise the brake system pressure to its maximum level. Accordingly, in this application the oscillation strokes for properly seating of the brake system and associated pedal actuating device will continue until such time as the hydraulic pump is turned on by the internal sensor forming a part of the anti-skid braking system. This turn on point will be sensed by the central control means via the increased power draw from the vehicle battery and the duration of the run time for the hydraulic pump will be measured to insure that the anti-skid brake system reaches full pressure within a predetermined amount of pump run time. If the system does not reach full pressurization within this pre-established run time, this will signal that there is either a leak in the system or alternatively that the pump or associated pressure sensor is not operating correctly and hence the vehicle will be rejected and the test aborted in this point in time.

Assuming, however, that the hydraulic pump does in fact dully pressurize the anti-skid braking system within the appropriate time frame, the test procedure will then continue. At this point in time, the pedal actuating device 16 will initiate a calibration stroke wherein the brake pedal engaging head 38 will move forward under a very low actuating force and into engagement with and possibly slightly depressing the brake pedal 36. The actual force applied to the brake pedal will be sensed by sensor 34 in head 38 and a signal indicative thereof sent to central processor 18. Thereafter the actuating force supplied to pedal actuating device 16 will be increased to a high maximum level at which time the actual pressure applied to the brake pedal will be sensed and a second signal sent to the central processor 18. The central processor will them perform a calibration step by comparing the actual applied pressure to the actuating force supplied to the brake actuating device so as to thereby compensate for variances in operating resistance within the system.

Upon completion of the calibration stroke, a dwell period is provided in order to allow the vehicle brake system to completely return to a relaxed, deactuated position. It should be noted that at this point the anti-skid braking system has experienced one brake application cycle and hence for the above referenced example vehicle the anti-skid braking system will have a pressure of approximately 170 bar assuming everything is in proper working order.

Next, the pedal actuating control means 14 will signal the pedal actuating device 16 to advance the brake pedal engaging head 38 from its disengaged home position forwardly until it just engages the brake pedal. This will provide an indication that in fact the brake pedal has returned to its intended at rest location and in order to verify this the pedal actuating device will record a measurement of the distance travelled by the pedal engaging head 38 in order to reach engagement with the brake pedal. If for some reason the travel exceeds a predetermined amount, the test procedure will be aborted at this point and the vehicle rejected.

However, assuming that the head 38 engages the brake pedal within the predetermined travel distance, this point of engagement will be noted by the central control means 18 and the pedal actuating device will be actuated to move forwardly thereby further depressing the brake pedal until such time as a predetermined force has been applied thereto as sensed by sensor 34 associated with the pedal actuating device 16. The distance sensor 36 of the pedal actuating device 16 will transmit a signal to the pedal actuating control means 14 indicative of the distance travelled by the brake pedal during application of this predetermined force thereto which information will be recorded by the central processing unit 18 for subsequent use. If for some reason the distance travelled by the pedal actuating head 16 and hence the vehicle brake pedal during application of this predetermined force is outside of a predetermined distance range, this will indicate a problem with the vehicle brake system and the test will be aborted with the vehicle being rejected at this point. Assuming, however, that the distance travelled is within the predetermined acceptable range, the test will continue and the pedal actuating device 16 will then proceed to increase the force being applied to the vehicle brake pedal to a second higher predetermined level. An increase level of sensitivity of distance travelled by the vehicle brake pedal as sensed by sensor 36 will be employed during the application of this higher predetermined level of pressure and a determination made as to whether the increased amount of travel falls within a second predetermined acceptable range. If the distance travelled is outside of this second predetermined range, this will indicate that the brake system has a leak some place in it and the test will be aborted at this point with the vehicle being rejected. However, assuming that the distance travelled is within the second predetermined range of acceptable movement, the test procedure will then continue with the head retracting to home position and the vehicle brake system being allowed to return to a relaxed deactuated position.

It should be noted that at this point in time there have been two complete brake application cycles and hence in connection with the example vehicle anti-skid brake system referenced above, the pressure within the accumulator at this point in time will be approximately 160 bar.

At this point in time the pedal actuating device 16 will again advance to the point of engagement with the vehicle brake pedal thereby providing an assurance that the brake pedal has once again returned to its proper position. Thereupon the pedal actuating head 38 will be advanced thereby depressing the vehicle brake pedal and applying thereto a predetermined amount of force. During this application, the distance travelled by the brake pedal will again be measured by sensor 36 to insure the amount of travel exceeds a predetermined minimum distance. It is only necessary to insure that a minimum distance of travel is experienced by the brake pedal during this phase of the test because a characteristic of such anti-skid braking systems is that the decrease of pressure within the accumulator will result in a reduced amount of pedal travel. Hence, assuming that the system is fluid tight and no leakage has occurred and the system is thus at approximately 160 bar pressure at the initiation of this last step, the amount of pedal travel will exceed a certain predetermined minimum. If, however, for some reason the pressure within the anti-skid braking system has decreased below the predetermined range, the amount of pedal travel sensed will be reduced below the required minimum and thus this measurement will provide an indication of a leak within the anti-skid braking system. Thus, if such minimum amount of travel has not been exceeded, the test will be aborted and the vehicle rejected at this point.

Assuming that the brake system has performed satisfactorily up to this point in time, the test will now be complete and the operator will then remove the cables connected to the battery as well as the pedal actuating device from the vehicle 10 and the vehicle 10 will then proceed down the assembly line while the operator prepares to repeat the procedure on the next incoming vehicle.

Figure 4:
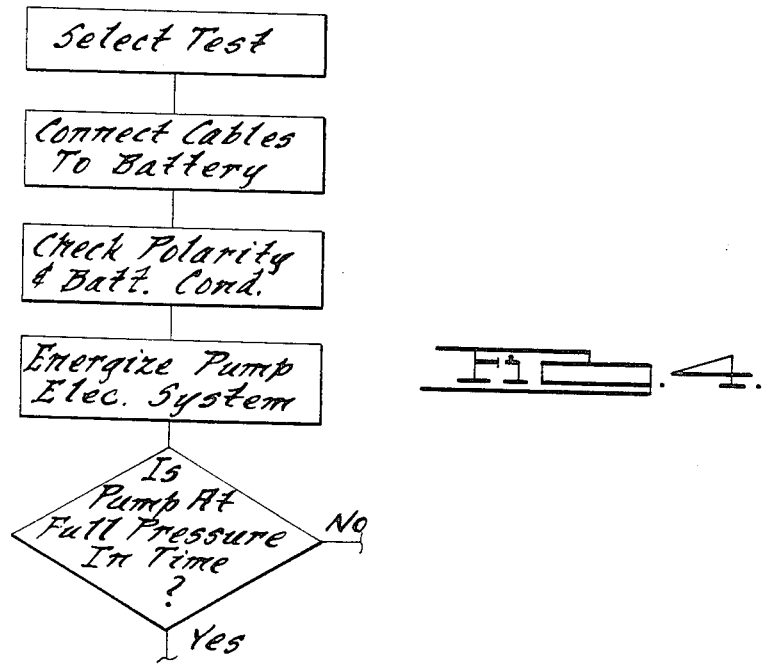
FIG. 4 is a flowchart similar to that illustrated in FIG. 3 but showing a slightly different sequence of events during the initial portion of the method.

In some cases it may not be possible to energize the vehicle electrical system at the work station preceding the brake test work station and thus necessitate a modified test method be employed for performing the brake test. Such a modified version of the test method described above is illustrated in FIG. 4 and in this case the operator will first select the appropriate test procedure to be followed which, with reference to the concerned invention, will be the anti-skid brake system test procedure forming a part of the present invention. Thereupon the operator will proceed to connect the cables 22, 24 to the vehicle battery and the test apparatus will check both polarity and battery condition as previously described. Once the apparatus has verified that the polarity is correct and recorded the condition of the battery, the operator may procced to energize the hydraulic pump in any suitable manner such as moving the ignition key to an "on" position. At this point in time the test apparatus will proceed to note the startup of the hydraulic pump and to time the period required for the pump to raise the pressure in the anti-skid brake system to its maximum level. If for some reason this time required for full pressurization is outside of a predetermined range, the test procedure will be aborted and the vehicle rejected. If, however, the system reaches full pressure within the appropriate time range, the test will proceed in the same manner as described above with reference to FIG. 3.

Referring now to FIG. 5, there is disclosed an alternative embodiment of the present invention which is particularly designed for use in applications where for some reason it is undesirable to connect or otherwise energize the vehicle electrical system by means of its own power source. Accordingly, this embodiment incorporates the same elements as incorporated in the test apparatus described above with reference to FIG. 2, such elements being indicated by like reference numerals primed. However, in addition to these elements the central processor housing will also incorporate therein a suitable power source 40 operative to provide twelve volts D.C. or other appropriate power as required to the vehicle electrical system. Power draw from this power source will be monitored to determine both initiation as well as duration of operation of the hydraulic brake system pump in a like manner as described above with reference to FIG. 2, however, the provision of an internal power source will enable the test apparatus to be utilized without regard to whether or not the vehicle battery has been installed and/or connected at this point in time. The test method employed in utilizing the embodiment of FIG. 5 will be substantially identical to that described with reference to FIG. 4 wherein the cables must be connected to the vehicle electrical system prior to energization of the pump motor.

It should be noted that while the above embodiments have been described with reference to power draw sensing and/or power supply connections being made to the vehicle electrical system by means of the battery cables, these connections may be made at any suitable location on the vehicle which will enable the system to monitor the power being utilized by the hydraulic anti-skid brake system pump. Accordingly, in some applications it may be desirable to directly connect such sensing means and/or power supply means to the pump motor connections themselves assuming such connections may be more readily accessible than the vehicle battery cables.

While it will be apparent that the preferred embodiment of the invention disclosed is well calculated to provide the advantages and features above stated, it will be appreciated that the invention is susceptible to modification, variation and change without departing from the proper scope of fair meaning of the subjoined claims.

We claim:

1. A method for testing a brake system of a vehicle which system includes an electrically driven actuating pressure generating means operative to generate brake actuating pressure for a portion of the brake system independently of pressure by application of a brake pedal, a pressure reservoir associated therewith, and other components necessary to effect braking of said vehicle, said method comprising:
    enabling operation of said vehicle's electrically driven pressure generating means so as to allow pressurizing of said reservoir;
    monitoring the duration of operation of said pressure generating means subsequent to enabling operation thereof and rejecting said vehicle brake system in the event said duration of operation exceeds a predetermined maximum time;

thereafter applying a predetermined pressure of said brake pedal to actuate said brake system and making a first measurement of the distance of travel of said brake pedal;

releasing said pressure on said brake pedal;

reapplying said predetermined pressure to said brake pedal and making a second measurement of the distance of travel of said brake pedal; and comparing said first and second measurements and rejecting said vehicle brake system if the difference between said first and second measurements is outside of a predetermined range.

2. A method as set forth in claim 1 further comprising monitoring operation of said pressure generating means during said applying and reapplying of said brake pedal pressure and rejecting said vehicle brake system in the event of startup of said pressure generating means.

3. A method as set forth in calim 1 further comprising repeatedly applying pressure to said brake pedal of said brake system a sufficient number of times to initiate operation of said pressure generating means.

4. A method as set forth in claim 3 further comprising the step of monitoring the duration of operation of said pressure generating means and rejecting said brake system if said duration is outside of a predetermined time range.

5. A method as set forth in claim 4 further comprising sensing the voltage available to said pressure generating means and setting said predetermined time range in accordance with the value of said sensed voltage.

6. A method as set forth in claim 3 wherein said repeatedly applying pressure to said brake pedal of said brake system a sufficient number of times is performed prior to the step of applying a predetermined pressure to said brake pedal in order to properly seat the components of said system.

7. A method as set forth in claim 1 wherein said vehicle includes an electrical system for supplying power to said pressure generating means and said enabling operation of said pressure generating means comprises connecting electrical conductors to the vehicle electrical system to provide a source of power to said pressure generating means.

8. A method for testing an anti-skid brake system in a vehicle having a reservoir, an electrically driven pump operative to generate within said reservoir brake actuating pressure independently of pressure generated by application of the vehicle brake pedal, said method comprising:

enabling operation of said electrically driven pump to thereby raise the pressure within said reservoir to a predetermined upper limit;

monitoring the time required for said pump to raise said pressure to said upper limit and rejecting said vehicle if said time exceeds a predetermined maximum;

applying a first predetermined pressure to said brake pedal to actuate said brake system and recording the distance travelled by said brake pedal;

applying a second higher predetermined pressure to said brake pedal while recording the additional distance travelled by said brake pedal and rejecting said vehicle if said additional distance is outside of a second predetermined range;

releasing said first and second predetermined pressures and allowing said brake system to return to an inactive position; and reapplying said first predetermined pressure to said brake pedal while recording the distance travelled by said brake pedal, determining the difference between said distance travelled during said reapplication and said distance travelled during said application of said first predetermined pressure and rejecting said vehicle brake system if said difference is outside a third predetermined range.

9. A method as set forth in claim 8 further comprising the step of continuously monitoring operation of said pump subsequent to said reservoir reaching said upper limit and rejecting said vehicle brake system in the event of operation of said pump during applications of brake pedal pressure less than a predetermined number of times.

10. A method as set forth in claim 8 further comprising sensing the voltage available to said pressure generating means and setting said predetermined maximum time in accordance with the value of said sensed voltage.

11. A method as set forth in claim 8 wherein said vehicle includes an electrical system for providing electrical power and said pump operation is enabled by energizing said vehicle electrical system.

12. A method as set forth in claim 11 further comprising connecting sensor means to said vehicle to sense operation of said pump.

13. A method as set forth in claim 8 further comprising the step of repeatedly applying pressure to said brake pedal a sufficient number of times to reduce the pressure in said reservoir to a level at which operation of said pump begins to repressurize said reservoir.

14. A method as set forth in claim 13 wherein said repeatedly applying pressure to said brake pedal of said brake system a sufficient number of times is performed prior to the step of applying a first predetermined pressure to said brake pedal in order to properly seat said brake system.

15. Apparatus for testing a vehicle brake system, said vehicle brake system incorporating force generating means for generating brake application force independently of the pressure exerted by an operator applied brake actuating means, said testing apparatus comprising:

means for automatically cyclically actuating said brake actuating means;

first sensing means for sensing generating a signal indicative of the frequency of operation and duration of operation of said independent force generating means of said vehicle brake system;

second sensing means for generating a signal indicative of the pressure applied to said brake actuating means;

third sensing means for generating a signal indicative of the distance moved by said brake actuating means; and control means operative to control operation of said cyclic actuating means and to receive signals from said first, second, and third sensing means, said control means utilizing said signals to determine if said independent force generating means and said brake actuating means of said vehicle brake system is are operating within predetermined acceptable limits whereby operation of said vehicle brake system is verified.

16. Apparatus for testing a vehicle anti-skid brake system, said brake system including an electrically driven hydraulic pump means for generating brake actuating pressure independently of brake application pressure generated by a brake pedal actuated master cylinder associated with said brake system, said apparatus comprising:

means for sensing when said hydraulic pump is started and stopped and generating signals indicative thereof;

timer means for determining the running duration of said pump from said signals;

brake pedal actuating means for cyclically applying predetermined actuating pressures to said brake pedal;

sensor means for sensing the distance of travel of said brake pedal required in order to apply said predetermined actuating pressures and generating a signal indicative thereof; and central processing means for controlling operation of said actuating means and receiving information from said sensing means and said timer means indicating when said pump started and how long it ran and said signal from said sensor means and determining if said information is within acceptable ranges to thereby verify the integrity of said brake system.

* * * * *

UNITED STATES PATENT AND TRADEMARK OFFICE
CERTIFICATE OF CORRECTION

PATENT NO. : 4,771,387

DATED : September 13, 1988

INVENTOR(S) : Hans Hexel and Harold Marenbach

It is certified that error appears in the above-identified patent and that said Letters Patent is hereby corrected as shown below:

Column 2, line 30, "genreating" should be --generating--.

Column 3, line 23, after "disposed" insert --therein--.

Column 3, line 27, "suitble" should be --suitable--.

Column 4, line 59, "ani-skid" should be --anti-skid--.

Column 5, line 61, "dully" should be --fully--.

Column 7, line 62, "procced" should be --proceed--.

Column 8, line 52, "of" (first occurrence) should be --or--.

Column 9, line 3, Claim 1, "of" should be --to--.

Column 9, line 21, Claim 3, "calim" should be --claim--.

Column 10, line 50, Claim 15, delete "sensing" (second occurrence).

Column 10, line 66, Claim 15, delete "is".

Signed and Sealed this

Twenty-first Day of February, 1989

*Attest:*

DONALD J. QUIGG

*Attesting Officer*          *Commissioner of Patents and Trademarks*